United States Patent
Song et al.

(10) Patent No.: US 12,086,312 B2
(45) Date of Patent: Sep. 10, 2024

(54) APPARATUS AND METHOD OF CONTROLLING LIGHT SOURCE IN EYE TRACKING USING GLINT

(71) Applicant: Samsung Electronics Co., Ltd., Suwon-si (KR)

(72) Inventors: Joonyoung Song, Suwon-si (KR); Doukyoung Song, Suwon-si (KR); Jina Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 18/079,403

(22) Filed: Dec. 12, 2022

(65) Prior Publication Data
US 2023/0195223 A1   Jun. 22, 2023

Related U.S. Application Data

(63) Continuation of application No. PCT/KR2022/014724, filed on Sep. 30, 2022.

(30) Foreign Application Priority Data

Dec. 20, 2021 (KR) .................. 10-2021-0182950
Jan. 24, 2022 (KR) .................. 10-2022-0009759

(51) Int. Cl.
*G06F 3/01* (2006.01)
*H04B 10/50* (2013.01)
(Continued)

(52) U.S. Cl.
CPC .............. *G06F 3/013* (2013.01); *H04B 10/50* (2013.01); *H04N 5/30* (2013.01); *H04N 25/41* (2023.01)

(58) Field of Classification Search
CPC .......... G06F 3/013; H04B 10/50; H04N 5/30; H04N 25/41; G02B 2027/0134;
(Continued)

(56) References Cited

U.S. PATENT DOCUMENTS

2003/0098954 A1   5/2003   Amir et al.
2006/0139472 A1*  6/2006   Hong ................. H04N 23/6845
                                                      348/E5.079
(Continued)

FOREIGN PATENT DOCUMENTS

JP   2016-532217 A   10/2016
JP   2017-040958 A    2/2017
(Continued)

OTHER PUBLICATIONS

International Search Report dated Jan. 10, 2023, issued in an International Application No. PCT/KR2022/014724.

*Primary Examiner* — Hung H Lam
(74) *Attorney, Agent, or Firm* — Jefferson IP Law, LLP

(57) ABSTRACT

A device and method of controlling a light source in eye tracking using a glint are provided. The method includes transmitting, from a processor to a first camera and a second camera, an activation signal to instruct the first and second cameras to operate according to a pattern, transmitting, to a first light driver and a second light driver, a control command to instruct the first and second light drivers to operate according to a control signal (a first control signal or a second control signal) corresponding to each of the first and second light drivers, and preventing the processor from intervening in a process of turning on and off odd-numbered light sources and even-numbered light sources.

20 Claims, 7 Drawing Sheets

(51) Int. Cl.
*H04N 5/30* (2006.01)
*H04N 25/40* (2023.01)

(58) Field of Classification Search
CPC ...... G02B 2027/0138; G02B 2027/014; G02B 27/0172; G02B 2027/0178; G02B 2027/0187
See application file for complete search history.

(56) References Cited

U.S. PATENT DOCUMENTS

| | | |
|---|---|---|
| 2013/0308099 A1 | 11/2013 | Stack |
| 2014/0055422 A1* | 2/2014 | Guimaraes ............. G06F 3/042 |
| | | 345/175 |
| 2017/0032531 A1* | 2/2017 | Nagata ................. H04N 13/271 |
| 2019/0172222 A1* | 6/2019 | Ebisawa ................. G06T 7/593 |
| 2019/0364231 A1 | 11/2019 | Kim et al. |
| 2022/0003873 A1* | 1/2022 | Park ........................ G06T 7/521 |
| 2022/0394168 A1* | 12/2022 | Wu ........................... G06T 7/20 |
| 2023/0421908 A1* | 12/2023 | Rana ....................... G06F 3/013 |

FOREIGN PATENT DOCUMENTS

| | | |
|---|---|---|
| JP | 2017-111746 A | 6/2017 |
| KR | 10-2013-0111791 A | 10/2013 |
| KR | 10-2016-0108388 A | 9/2016 |
| KR | 10-1774694 B1 | 9/2017 |
| KR | 10-2020-0110172 A | 9/2020 |
| KR | 10-2021-0079774 A | 6/2021 |
| KR | 10-2023-0044781 A | 4/2023 |

* cited by examiner

APPARATUS AND METHOD OF CONTROLLING LIGHT SOURCE IN EYE TRACKING USING GLINT

CROSS-REFERENCE TO RELATED APPLICATION(S)

This application is a continuation application, claiming priority under § 365(c), of an International application No. PCT/KR2022/014724, filed on Sep. 30, 2022, which is based on and claims the benefit of a Korean patent application number 10-2021-0182950, filed on Dec. 20, 2021, in the Korean Intellectual Property Office, and of a Korean patent application number 10-2022-0009759, filed on Jan. 24, 2022, in the Korean Intellectual Property Office, the disclosure of each of which is incorporated by reference herein in its entirety.

BACKGROUND

1. Field

The disclosure relates to technology for controlling a light source in eye tracking using a glint.

2. Description of Related Art

With the development of computers including related arts such as mobile devices, handheld devices, and displays, has come the advancement of input mechanisms.

Among the input mechanisms, there is a user interface technology using eye gaze detection.

Eye tracking technology may involve shining a light from a light source onto a user's eye, detecting a corneal reflection (glint) of the user's eye through a camera, and tracking a gaze of the user's eye.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide technology for preventing a processor from intervening in a process of alternately turning on odd-numbered light sources and even-numbered light sources to perform eye tracking, which may decrease the likelihood of an error in control and may decrease power consumption.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of light sources configured to generate a glint in each of right and left eyes. The electronic device may include a first camera configured to output, to a first light driver, a first control signal to control odd-numbered light sources of the plurality of light sources according to a pattern. The electronic device may include a second camera configured to output, to a second light driver, a second control signal to control even-numbered light sources of the plurality of light sources according to the pattern. The electronic device may include the first light driver configured to control the odd-numbered light sources according to the first control signal. The electronic device may include the second light driver configured to control the even-numbered light sources according to the second control signal. The electronic device may include a processor configured to transmit, to the first camera and the second camera, an activation signal to instruct the first and second cameras to operate according to the pattern and transmit, to the first light driver and the second light driver, a control command to instruct the first and second light drivers to operate according to the first control signal and the second control signal, respectively.

In accordance with another aspect of the disclosure, an electronic device is provided. The electronic device includes a plurality of light sources configured to generate a glint in each of right and left eyes. The electronic device may include a first camera configured to output, to a first light driver, a first control signal to control odd-numbered light sources of the plurality of light sources in an odd-numbered frame. The electronic device may include a second camera configured to output, to a second light driver, a second control signal to control even-numbered light sources of the plurality of light sources in an even-numbered frame. The electronic device may include the first light driver configured to control the odd-numbered light sources according to the first control signal. The electronic device may include the second light driver configured to control the even-numbered light sources according to the second control signal. The electronic device may include a processor configured to transmit, to the first camera and the second camera, an activation signal to instruct the first and second cameras to operate according to the pattern and transmit, to the first light driver and the second light driver, a control command to instruct the first and second light drivers to operate according to the first control signal and the second control signal, respectively.

In accordance with another aspect of the disclosure, a method of controlling a light source in an electronic device is provided. The method includes a first operation of transmitting an activation signal from a processor to a first camera and a second camera and transmitting, to a first light driver and a second light driver, a control command to instruct the first and second light drivers to operate according to a first control signal and a second control signal, respectively. The method may include a second operation of outputting the first control signal from the first camera to the first light driver in response to a frame being odd-numbered. The method may include a third operation of turning on odd-numbered light sources of the plurality of light sources for a predetermined time in response to the first control signal being received by the first light driver. The method may include a fourth operation of outputting the second control signal from the second camera to the second light driver in response to a frame being even-numbered. The method may include a fifth operation of turning on even-numbered light sources of the plurality of light sources for a predetermined time in response to the second control signal being received by the second light driver. The method may include an operation of repeatedly performing the second to fifth operations until eye tracking is terminated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
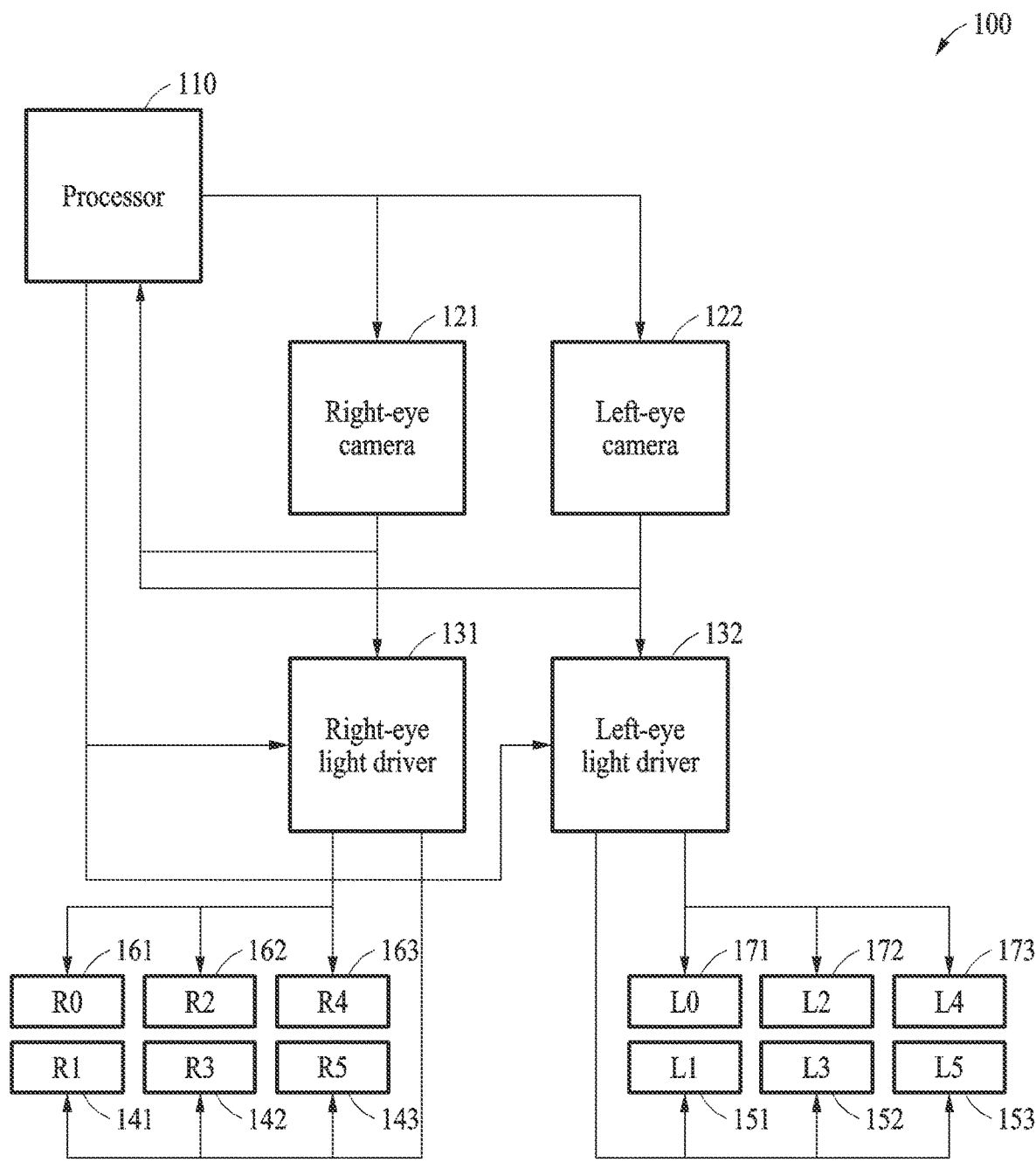
FIG. 1 is a diagram illustrating an example of a device for controlling a light source in eye tracking using a glint according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the disclosure.

Also, in the description of the components, terms such as first, second, A, B, (a), (b) or the like may be used herein when describing components of the disclosure. These terms are used only for the purpose of discriminating one constituent element from another constituent element, and the nature, the sequences, or the orders of the constituent elements are not limited by the terms. When one constituent element is described as being "connected," "coupled," or "attached" to another constituent element, it should be understood that one constituent element can be connected or attached directly to another constituent element, and an intervening constituent element can also be "connected," "coupled," or "attached" to the constituent elements.

The same name may be used to describe an element included in the example embodiments described above and an element having a common function. Unless otherwise mentioned, the descriptions of the examples may be applicable to the following examples and thus, duplicated descriptions will be omitted for conciseness.

Hereinafter, a device and method of controlling a light source in eye tracking using a glint according to an embodiment is described in detail with reference to the accompanying FIGS. 1 to 7.

FIG. 1 is a diagram illustrating an example of a device for controlling a light source in eye tracking using a glint according to an embodiment of the disclosure.

Referring to FIG. 1, an electronic device 100 may include a processor 110, a right-eye camera 121, a left-eye camera 122, a right-eye light driver 131, a left-eye light driver 132, right-eye odd-numbered light sources 141, 142, and 143 (odd-numbered does not refer to the reference numbers 141-143, but to R1, R3, and R5), left-eye odd-numbered light sources 151, 152, and 153 (odd-numbered does not refer to the reference numbers 151-153, but to L1, L3, and L5), right-eye even-numbered light sources 161, 162, and 163 (even-numbered does not refer to the reference numbers 161-163 but to R0, R2, and R4), and left-eye even-numbered lights sources 171, 172, and 173 (even-numbered does not refer to the reference numbers 171-173 but to L0, L2, and L4).

The processor 110 may transmit an activation signal to the right-eye camera 121 and the left-eye camera 122. In response to receiving a right-eye control signal from the right-eye camera 121 or receiving a left-eye control signal from the left-eye camera 122, the processor 110 may transmit, to the right-eye light driver 131 and the left-eye light driver 132, for each frame, a control command to control the odd-numbered light sources 141, 142, 143, 151, 152, and 153 and the even-numbered light sources 161, 162, 163, 171, 172, and 173 to be alternately turned on. The right-eye control signal and the left-eye control signal may be a signal in a form of a strobe.

The right-eye camera 121, as a camera for tracking a gaze of a right eye, may transmit the right-eye control signal to the processor 110 and the right-eye light driver 131 in response to receiving the activation signal from the processor 110.

The left-eye camera 122, as a camera for tracking a gaze of a left eye, may transmit the left-eye control signal to the processor 110 and the left-eye light driver 132 in response to receiving the activation signal from the processor 110.

In response to receiving the right-eye control signal from the right-eye camera 121 and receiving the control command from the processor 110, the right-eye light driver 131 may turn on the right-eye odd-numbered light sources 141, 142, and 143 or the right-eye even-numbered light sources 161, 162, and 163 corresponding to the control command.

In response to receiving the left-eye control signal from the left-eye camera 122 and receiving the control command from the processor 110, the left-eye light driver 132 may turn on the left-eye odd-numbered light sources 151, 152, and 153 or the left-eye even-numbered light sources 171, 172, and 173 corresponding to the control command.

However, referring to FIG. 1, each of the right-eye light driver 131 and the left-eye light driver 132, according to the control command from the processor 110, alternately turns on odd-numbered light sources and even-numbered light sources at very short intervals, which are up to 4 milliseconds (msec), and accordingly, the processor 110 that is required to transmit a control command at short intervals is likely to experience a control error.

In addition, transmitting a control command to turn on odd-numbered light sources or a control command to turn on even-numbered light sources for each frame using the processor 110 may increase power consumption.

Figure 2:
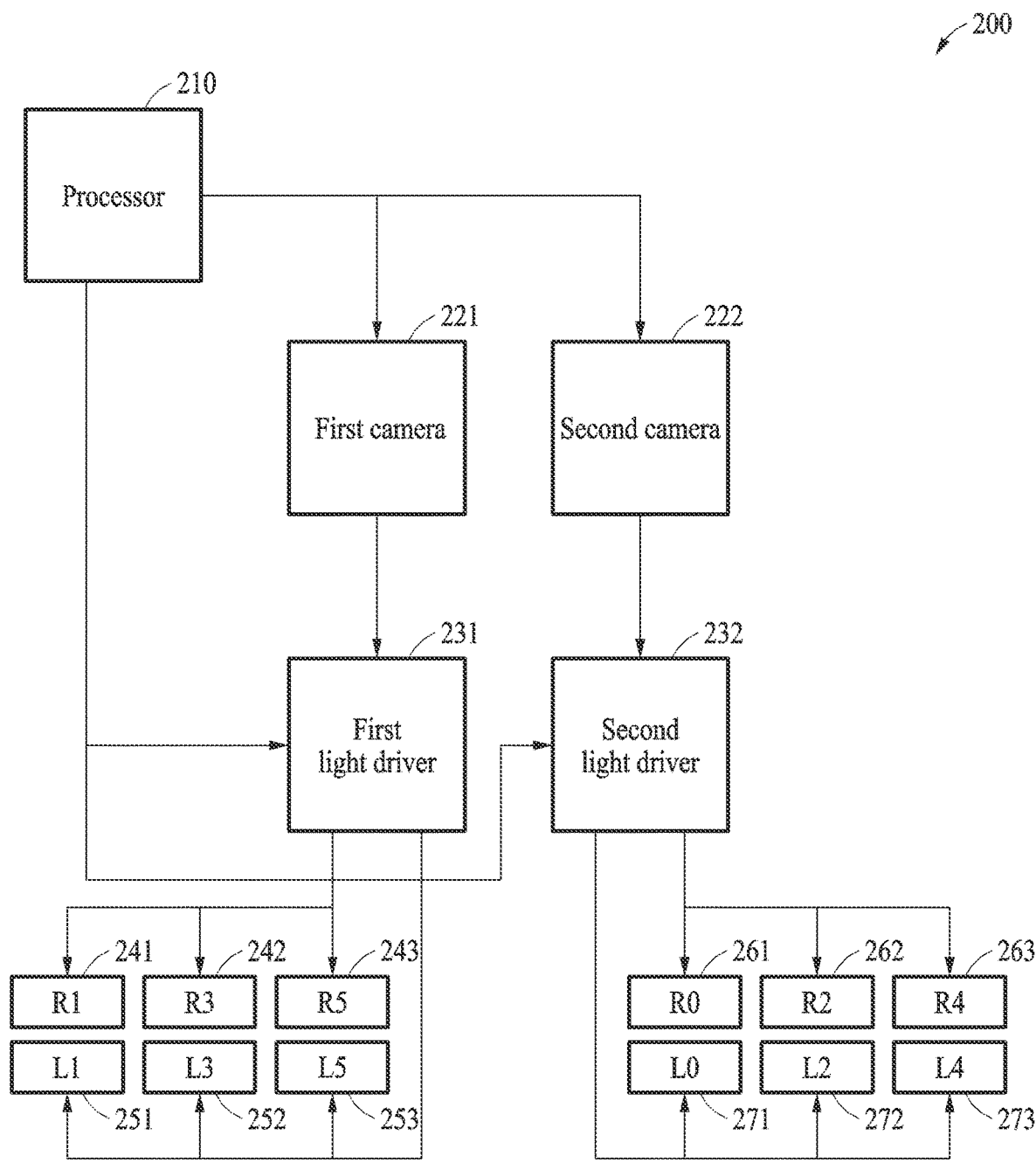
FIG. 2 is a diagram illustrating another example of an electronic device for controlling a light source in eye tracking using a glint according to an embodiment of the disclosure.

FIG. 2 is a diagram illustrating another example of an electronic device for controlling a light source in eye tracking using a glint according to an embodiment of the disclosure.

Referring to FIG. 2, an electronic device 200 may include a processor 210, a first camera 221, a second camera 222, a first light driver 231, a second light driver 232, right-eye odd-numbered light sources 241, 242, and 243, left-eye odd-numbered light sources 251, 252, and 253, right-eye even-numbered light sources 261, 262, and 263, and left-eye even-numbered light sources 271, 272, and 273.

The processor 210 may transmit, to the first camera 221 and the second camera 222, an activation signal to instruct the first and second cameras to operate according to a pattern and transmit, to the first light driver 231 and the second light driver 232, a control command to instruct the first and second light drivers to operate according to a first control signal or a second control signal. For example, the first control signal and the second control signal may be a signal in a form of a strobe. The first control signal may be a signal to be output from the first camera 221 to the first light driver 231, and the second control signal may be a signal to be output from the second camera 222 to the second light driver 232.

According to an embodiment, an activation pattern of the first camera 221 and the second camera 222 may be set by a developer in advance in a more suitable form according to a predetermined situation. For example, a pattern may be an iteration of a process of turning on and off odd-numbered light sources and turning on and off even-numbered light sources in sequence. As another example, a pattern may be an iteration of a process of turning on and off the odd-numbered light sources, turning on and off the even-numbered light sources, and pausing for one frame in sequence. However, a pattern is not limited to the above two patterns, and various patterns that are easy to use in the performing of eye tracking may be possible. As another example, a pattern may include a pause in which both the odd-numbered light sources and even-numbered light sources are turned off and also include an operation of simultaneously turning on both the odd-numbered light sources and even-numbered light sources.

According to an embodiment, the processor 210 may transmit the control command only once when starting eye tracking using the first camera 221 and the second camera 222.

For example, the processor 210 needs to transmit the activation signal to the first camera 221 and the second camera 222 only once and transmit the control command to the first light driver 231 and the second light driver 232 only once in the beginning of eye tracking, and accordingly, power consumption may be reduced.

According to an embodiment, the processor 210 may transmit the activation signal to the first camera 221 and the second camera 222 and transmit the control command to the first light driver 231 and the second light driver 232 through an inter-integrated circuit (I2C). However, a communication channel is not limited to an I2C, and various communication channels may be used.

According to an embodiment, the control command transmitted to the first light driver 231 and the second light driver 232 may be a command to turn on light sources controlled by the first light driver 231 based on a pattern in response to the first control signal being received by the first light driver 231 and a command to turn on light sources controlled by the second light driver 232 based on the pattern in response to the second control signal being received by the second light driver 232.

The first camera 221 may output, to the first light driver 231, the first control signal that controls odd-numbered light sources of a plurality of light sources according to the pattern.

In addition, the first camera 221 may capture a right eye and provide a captured image of the right eye to the processor 210.

The processor 210 may detect a pupil of the right eye and track a movement of the pupil of the right eye.

The second camera 222 may output, to the second light driver 232, the second control signal that controls even-numbered light sources of the plurality of light sources according to the pattern.

In addition, the second camera 222 may capture a left eye and provide a captured image of the left eye to the processor 210.

The processor 210 may detect a pupil of the left eye and track a movement of the pupil of the left eye.

According to an embodiment, the first camera 221 and the second camera 222 may or may not simultaneously output the first control signal and the second control signal.

According to an embodiment, the first light driver 231 may control right-eye odd-numbered light sources 241, 242, and 243 and left-eye odd-numbered light sources 251, 252, and 253 according to the first control signal received from the first camera 221.

For example, in response to receiving the first control signal from the first camera 221, the first light driver 231 may turn on the right-eye odd-numbered light sources 241, 242, and 243 and the left-eye odd-numbered light sources 251, 252, and 253 for a predetermined time.

According to an embodiment, the second light driver 232 may control the right-eye even-numbered light sources 261, 262, and 263 and the left-eye even-numbered light sources 271, 272, and 273 according to the second control signal received from the second camera 222.

For example, in response to receiving the second control signal from the second camera 222, the second light driver 232 may turn on the right-eye even-numbered light sources 261, 262, and 263 and the left-eye even-numbered light sources 271, 272, and 273 for a predetermined time.

The right-eye odd-numbered light sources 241, 242, and 243 may irradiate light to a right eye of a user under the control of the first light driver 231 and include a light emitting diode (LED) or an infrared ray (IR) LED.

The left-eye odd-numbered light sources 251, 252, and 253 may irradiate light to a left eye of the user under the control of the first light driver 231 and include an LED or an IR LED.

The right-eye even-numbered light sources 261, 262, and 263 may irradiate light to the right eye of the user under the control of the second light driver 232 and include an LED or an IR LED.

The left-eye even-numbered light sources 271, 272, and 273 may irradiate light to the left eye of the user under the control of the second light driver 232 and include an LED or an IR LED.

Meanwhile, as illustrated in FIG. 2, there may be six odd-numbered light sources, light sources 241, 242, 243, 251, 252, and 253, and there may be six even-numbered light sources, light sources 261, 262, 263, 271, 272, and 273, but there may be less or more than six light sources. For example, there may be twelve odd-numbered light sources, and there may be twelve even-numbered light sources.

Figure 3:
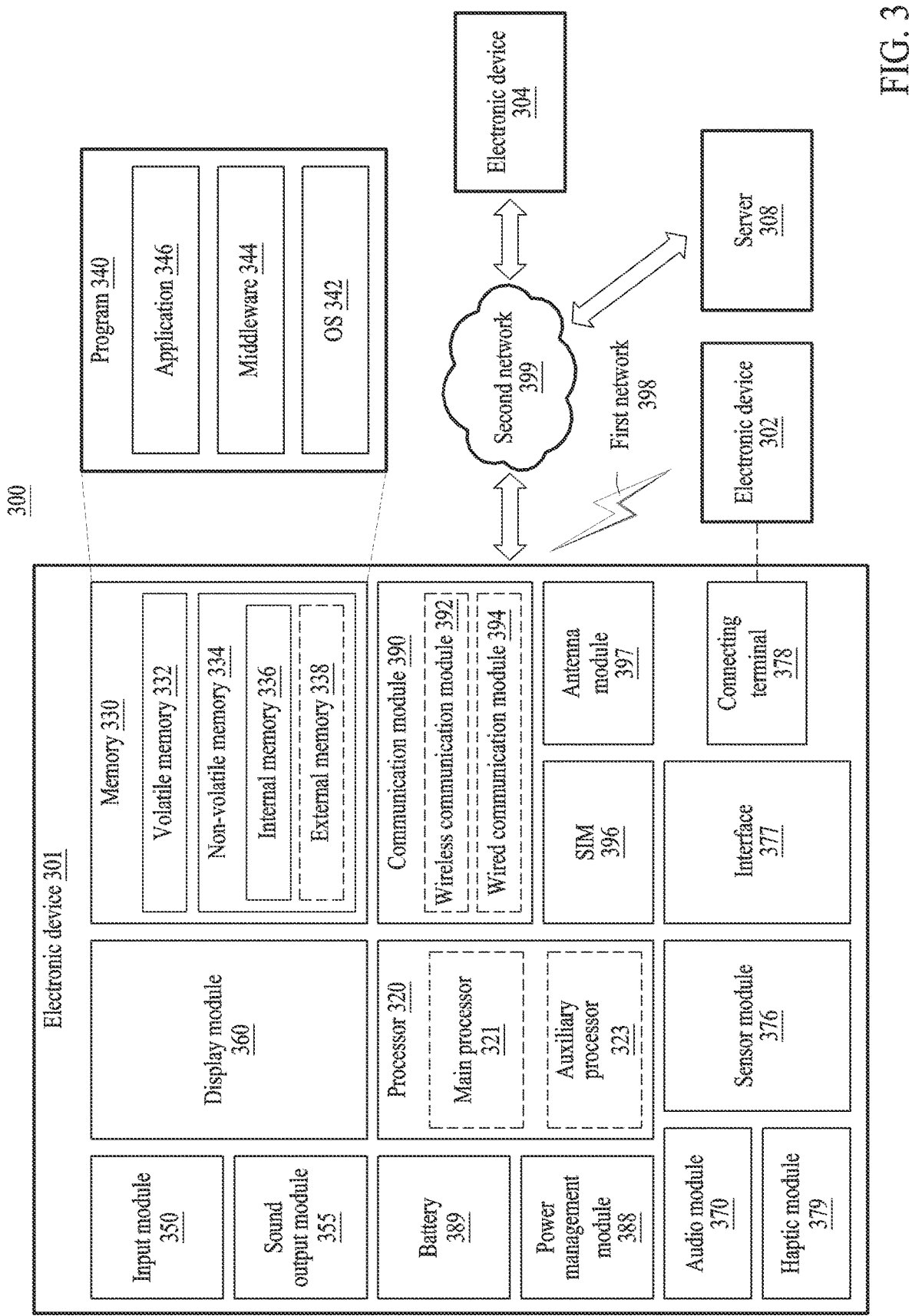
FIG. 3 is a block diagram illustrating an electronic device in a network environment according to an embodiment of the disclosure.

The electronic device 200 of FIG. 2 may be configured in a form of an electronic device 301 in a network environment as shown in FIG. 3.

FIG. 3 is a block diagram illustrating an electronic device in a network environment according to an embodiment of the disclosure.

Referring to FIG. 3, an electronic device 301 in a network environment 300 may communicate with an electronic device 302 via a first network 398 (e.g., a short-range wireless communication network), or communicate with at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, a memory 330, an input module 350, a sound output module 355, a display module 360, an audio module 370, and a sensor module 376, an interface 377, a connecting terminal 378, a haptic module 379, a power management module 388, a battery 389, a communication module 390, a subscriber identification module (SIM) 396, or an antenna module 397. In an embodiment, at least one of the components (e.g., the connecting terminal 378) may be omitted from the electronic device 301, or one or more of other components may be added to the electronic device 301. In some example embodiments, some of the components (e.g., the sensor module 376, the camera module 380, or the antenna module 397) may be integrated as a single component (e.g., the display module 360).

The processor 320 may execute, for example, software (e.g., a program 340) to control at least one other component (e.g., a hardware or software component) of the electronic device 301 connected to the processor 320, and may perform various data processing or computation. According to an example embodiment, as at least a part of data processing or computation, the processor 320 may store a command or data received from another component (e.g., the sensor module 376 or the communication module 390) in a volatile memory 332, process the command or the data stored in the volatile memory 332, and store resulting data in a non-volatile memory 334. According to an example embodiment, the processor 320 may include a main processor 321 (e.g., a central processing unit (CPU) or an application processor (AP)) or an auxiliary processor 323 (e.g., a graphics processing unit (GPU), a neural processing unit (NPU), an image signal processor (ISP), a sensor hub processor, or a communication processor (CP)) that is operable independently of, or in conjunction with the main processor 321. For example, when the electronic device 301 includes the main processor 321 and the auxiliary processor 323, the auxiliary processor 323 may be adapted to consume less power than the main processor 321 or to be specific to a specified function. The auxiliary processor 323 may be implemented separately from the main processor 321 or as a part of the main processor 321.

The auxiliary processor 323 may control at least some of functions or states related to at least one (e.g., the display module 360, the sensor module 376, or the communication module 390) of the components of the electronic device 301, instead of the main processor 321 while the main processor 321 is in an inactive (e.g., sleep) state or along with the main processor 321 while the main processor 321 is in an active state (e.g., executing an application). According to an example embodiment, the auxiliary processor 323 (e.g., an ISP or a CP) may be implemented as a portion of another component (e.g., the camera module 380 or the communication module 390) that is functionally related to the auxiliary processor 323. According to an example embodiment, the auxiliary processor 323 (e.g., an NPU) may include a hardware structure specified for artificial intelligence model processing. An artificial intelligence (AI) model may be generated by machine learning. The machine learning may be performed by, for example, the electronic device 301, in which artificial intelligence is performed, or performed via a separate server (e.g., the server 308). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

Meanwhile, the processor 320 may perform an operation of FIG. 2.

The memory 330 may store various pieces of data used by at least one component (e.g., the processor 320 or the sensor module 376) of the electronic device 301. The various pieces of data may include, for example, software (e.g., the program 340) and input data or output data for a command related thereto. The memory 330 may include the volatile memory 332 or the non-volatile memory 334. The non-volatile memory 334 may include internal memory 336 and/or external memory 338.

The program 340 may be stored as software in the memory 330, and may include, for example, an operating system (OS) 342, middleware 344, or an application 346.

The input module 350 may receive, from the outside (e.g., a user) the electronic device 301, a command or data to be used by another component (e.g., the processor 320) of the electronic device 301. The input module 350 may include, for example, a microphone, a mouse, a keyboard, a key (e.g., a button), or a digital pen (e.g., a stylus pen).

The sound output module 355 may output a sound signal to the outside the electronic device 301. The sound output module 355 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 360 may visually provide information to the outside (e.g., a user) of the electronic device 301. The display module 360 may include, for example, a control circuit for controlling a display, a hologram device, or a projector and control circuitry to control a corresponding one of the display, the hologram device, and the projector. According to an example embodiment, the display module 360 may include a touch sensor adapted to sense a touch, or a pressure sensor adapted to measure an intensity of a force incurred by the touch.

The audio module 370 may convert sound into an electric signal or vice versa. According to an example embodiment, the audio module 370 may obtain the sound via the input module 350 or output the sound via the sound output module 355 or an external electronic device (e.g., an electronic device 302 such as a speaker or headphones) directly or wirelessly connected to the electronic device 301.

The sensor module 376 may detect an operational state (e.g., power or temperature) of the electronic device 301 or an environmental state (e.g., a state of a user) external to the electronic device 301, and generate an electrical signal or data value corresponding to the detected state. According to an example embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

Meanwhile, the sensor module 376 may include the first camera 221, the second camera 222, the first light driver 231, the second light driver 232, the right-eye odd-numbered light sources 241, 242, and 243, the left-eye odd-numbered light sources 251, 252, and 253, the right-eye even-numbered light sources 261, 262, and 263, and the left-eye even-numbered light sources 271, 272, and 273. The first camera 221 and the second camera 222 may be implemented as an image sensor, and the right-eye odd-numbered light sources 241, 242, and 243, the left-eye odd-numbered light sources 251, 252, and 253, the right-eye even-numbered light sources 261, 262, and 263, and the right-eye even-numbered light sources 271, 272, and 273 may include an LED or an IR LED.

In addition, the sensor module 376 may further include a camera module capable of capturing a still image and a video. The camera module may include one or more of lenses, image sensors, image signal processors, or flashes.

The interface 377 may support one or more specified protocols to be used for the electronic device 301 to be coupled with the external electronic device (e.g., the electronic device 302) directly (e.g., by wire) or wirelessly. According to an example embodiment, the interface 377 may include, for example, a high-definition multimedia interface (HDMI), a universal serial bus (USB) interface, a secure digital (SD) card interface, or an audio interface.

For example, the electronic device 301 may transmit an image signal to an external electronic device through the connecting terminal 378. The electronic device 301 may transmit an image signal that allows the external electronic device to output an image to the display module 360 of the external electronic device.

The connecting terminal 378 may be provided to output an image signal or a voice signal. For example, the connecting terminal 378 may simultaneously output an image signal and a voice signal. For example, the electronic device 301 may output an image signal and a voice signal through an interface, such as an HDMI, a DisplayPort (DP), or a Thunderbolt, in the connecting terminal 378 that simultaneously outputs the image and the voice signal.

The connecting terminal 378 may include a connector via which the electronic device 301 may be physically connected to an external electronic device (e.g., the electronic device 302). According to an example embodiment, the connecting terminal 378 may include, for example, an HDMI connector, a DP connector, a Thunderbolt connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via his or her tactile sensation or kinesthetic sensation. According to an example embodiment, the haptic module 379 may include, for example, a motor, a piezoelectric element, or an electric stimulator.

The power management module 388 may manage power supplied to the electronic device 301. According to an example embodiment, the power management module 388 may be implemented as, for example, at least a part of a power management integrated circuit (PMIC).

The battery 389 may supply power to at least one component of the electronic device 301. According to an example embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that operate independently of the processor 320 (e.g., an AP) and support direct (e.g., wired) communication or wireless communication. According to an example embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module, or a power line communication (PLC) module). A corresponding one of these communication modules may communicate with the electronic device 304 via the first network 398 (e.g., a short-range communication network, such as Bluetooth™, wireless-fidelity (Wi-Fi) direct, or infrared data association (IrDA)) or the second network 399 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the SIM 396.

The wireless communication module 392 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., a mmWave band) to achieve, e.g., a high data transmission rate. The wireless communication module 392 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 392 may support various requirements specified in the electronic device 301, an external electronic device (e.g., the electronic device 304), or a network system (e.g., the second network 399). According to an example embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an example embodiment, the antenna module 397 may include an antenna including a radiating element including a conductive material or a conductive pattern formed in or on a substrate (e.g., a printed circuit board (PCB)). According to an example embodiment, the antenna module 397 may include a plurality of antennas (e.g., array antennas). In such a case, at least one antenna appropriate for a communication scheme used in a communication network, such as the first network 398 or the second network 399, may be selected by, for example, the communication module 390 from the plurality of antennas. The signal or power may be transmitted or received between the communication module 390 and the external electronic device via the at least one selected antenna. According to an example embodiment, another component (e.g., a radio frequency integrated circuit (RFIC)) other than the radiating element may be additionally formed as a part of the antenna module 397.

According to various example embodiments, the antenna module 397 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the external electronic devices 302 or 304 may be a device of the same type as or a different type from the electronic device 301. According to an embodiment, all or some of operations to be executed by the electronic device 301 may be executed at one or more external electronic devices (e.g., the external devices 302 and 304, and the server 308). For example, if the electronic device 301 needs to perform a function or a service automatically, or in response to a request from a user or another device, the electronic device 301, instead of, or in addition to, executing the function or the service, may request one or more external electronic devices to perform at least portion of the function or the service. The one or more of external electronic devices receiving the request may perform the at least part of the function or service, or an additional function or an additional service related to the request, and may transfer an outcome of the performing to the electronic device 301. The electronic device 301 may provide the result, with or without further processing of the result, as at least part of a response to the request. To that end, cloud computing, distributed computing, mobile edge computing (MEC), or client-server computing technology may be used, for example. The electronic device 301 may provide ultra low-latency services using, e.g., distributed computing or mobile edge computing. In an example embodiment, the external electronic device 304 may include an Internet-of-things (IoT) device. The server 308 may be an intelligent server using machine learning and/or a neural network. According to an example embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

Figure 4:
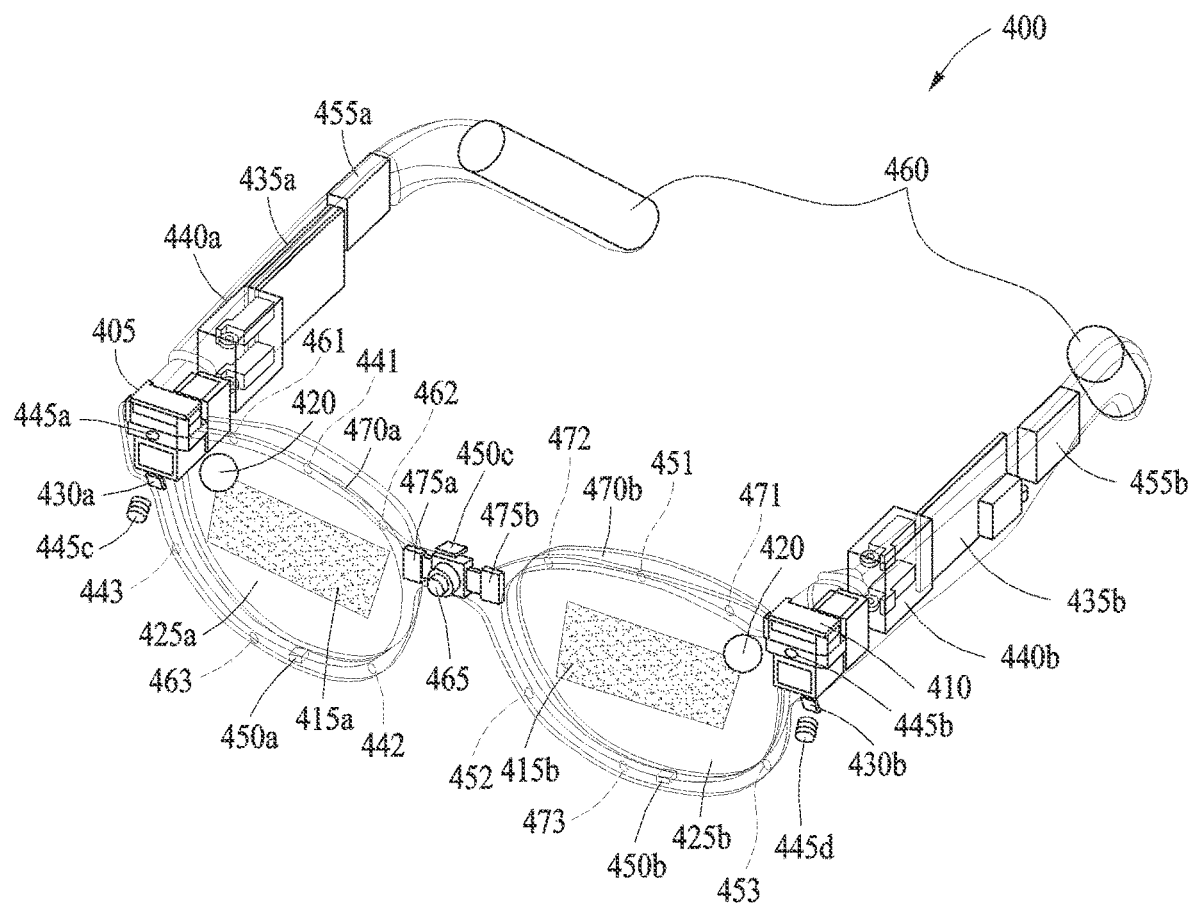
FIG. 4 is a diagram illustrating a structure of an electronic device implemented in a form of wearable augmented reality (AR) eyeglasses according to an embodiment of the disclosure.

FIG. 4 is a diagram illustrating a structure of an electronic device implemented in a form of wearable AR eyeglasses according to an embodiment of the disclosure.

Referring to FIG. 4, an electronic device 400 may be worn on a face of a user to provide an image associated with an AR service and/or a virtual reality service to the user.

In an embodiment, the electronic device 400 may include a first display 405, a second display 410, a first screen display portion 415a, a second screen display portion 415b, an input optical member 420, a first transparent member 425a, a second transparent member 425b, lighting units 430a and 430b, a first PCB 435a, a second PCB 435b, a first hinge 440a, a second hinge 440b, first cameras 445a, 445b, 445c, and 445d, a plurality of microphones (e.g., a first microphone 450a, a second microphone 450b, and a third microphone 450c), a plurality of speakers (e.g., a first speaker 455a and a second speaker 455b), a battery 460, second cameras 475a and 475b, a third camera 465, visors 470a and 470b, right-eye odd-numbered light sources 441, 442, and 443, left-eye odd-numbered light sources 451, 452, and 453, right-eye even-numbered light sources 461, 462, and 463, left-eye even-numbered light sources 471, 472, and 473.

The right-eye odd-numbered light sources 441, 442, and 443 may correspond to the right-eye odd-numbered light sources 241, 242, and 243 of FIG. 2, the left-eye odd-numbered light sources 451, 452, and 453 may correspond to the left-eye odd-numbered light sources 251, 252, 253 of FIG. 2, the right-eye even-numbered light sources 461, 462, and 463 may correspond to the right-eye even-numbered light sources 261, 262, and 263 of FIG. 2, and the left-eye even-numbered light sources 471, 472, and 473 may correspond to the left-eye even-numbered light sources 271, 272, and 273 of FIG. 2.

In an embodiment, a display (e.g., the first display 405 and the second display 410) may include, for example, a liquid crystal display (LCD), a digital mirror device (DMD), a liquid crystal on silicon (LCoS), an organic light-emitting diode (OLED), a micro-LED, or the like. Although not shown, when the display is one of an LCD, a DMD, or an LCoS, the electronic device 400 may include a light source configured to irradiate light to a screen output region of the display. In an example embodiment, when the display is capable of generating light by itself, for example, when the display is either an OLED or a micro-LED, the electronic device 400 may provide a virtual image with a relatively high quality to the user even though a separate light source is not included. In an example embodiment, when the display is implemented as the OLED or the micro LED, a light source may be unnecessary, and accordingly the electronic device 400 may be reduced in weight. Hereinafter, a display capable of generating light by itself may be referred to as a "self-luminous display," and it can be assumed that relevant descriptions are referring to a self-luminous display.

A display (e.g., the first display 405 and the second display 410) according to an embodiment of the disclosure may include at least one micro-LED. For example, the micro-LED may express red (R), green (G), and blue (B) by emitting light by itself, and a single chip may implement a single pixel (e.g., one of R, G, or B pixels) because the micro-LED is relatively small in size (e.g., 100 micrometer (m) or less). Accordingly, the display may provide a high resolution without a backlight unit (BLU), when the display is composed of a micro-LED.

However, the example embodiments are not limited thereto. A single pixel may include R, G, and B pixels, and a single chip may be implemented by a plurality of pixels including R, G, and B pixels.

In an embodiment, the display (e.g., the first display 405 and the second display 410) may be composed of a display area made up of pixels for displaying a virtual image, and light-receiving pixels (e.g., photo sensor pixels) disposed among the pixels that receive the light reflected from eyes, convert the reflected light into electrical energy, and output light.

In an embodiment, the electronic device 400 may detect a gaze direction (e.g., a movement of a pupil) of the user through the light receiving pixels. For example, the electronic device 400 may detect and track a gaze direction of a right eye of the user and a gaze direction of a left eye of the user through one or more light-receiving pixels of the first display 405 and one or more light-receiving pixels of the second display 410. The electronic device 400 may determine a central position of a virtual image according to the gaze directions of the right eye and the left eye of the user (e.g., directions in which pupils of the right eye and the left eye of the user gaze) detected through the one or more light-receiving pixels.

In an embodiment, the right-eye odd-numbered light sources 441, 442, and 443, the left-eye odd-numbered light sources 451, 452, and 453, the right-eye even-numbered light sources 461, 462, and 463, and the left-eye even-numbered light sources 471, 472, and 473 attached to the periphery of a frame of the electronic device 400 may be used as auxiliary elements for facilitating detection of an eye gaze when capturing a pupil using the second cameras 475a and 475b. When the right-eye odd-numbered light sources 441, 442, and 443, the left-eye odd-numbered light sources 451, 452, and 453, the right-eye even-numbered light sources 461, 462, and 463, and the left-eye even-numbered light sources 471, 472, and 473 are used as auxiliary elements to detect an eye gaze, the light sources may include an LED or IR LED that generates an infrared wavelength. The second camera 475a may correspond to the first camera 221 of FIG. 2, and the second camera 475b may correspond to the second camera 222 of FIG. 2.

In an embodiment, light emitted from the display (e.g., the first display 405 and the second display 410) may reach the first screen display portion 415a formed on the first transparent member 425a that faces the right eye of the user, and the second screen display portion 415b formed on the second transparent member 425b that faces the left eye of the user, by passing through a lens (not shown) and a waveguide. For example, the light emitted from the display (e.g., the first display 405 and the second display 410) may be reflected from a grating area formed in the input optical member 420 and the screen display portions 415a and 415b, and may be transmitted to the eyes of the user, passing through the waveguide. The first transparent member 425a and/or the second transparent member 425b may be formed of a glass plate, a plastic plate, or a polymer, and may be transparent or translucent.

In an embodiment, the lens (not shown) may be disposed on a front surface of the display (e.g., the first display 405 and the second display 410). The lens (not shown) may include a concave lens and/or a convex lens. For example, the lens (not shown) may include a projection lens or a collimation lens.

In an embodiment, the screen display portions 415a and 415b or a transparent member (e.g., the first transparent member 425a and the second transparent member 425b) may include a lens including a waveguide and a reflective lens.

In an embodiment, the waveguide may be formed of glass, plastic, or a polymer, and may have a nanopattern formed on one inside surface or one outside surface, for example, a grating structure of a polygonal or curved shape. According to an embodiment, light incident to one end of the waveguide may be propagated inside a display waveguide by the nanopattern to be provided to the user. In an embodiment, a waveguide including a free-form prism may provide incident light to the user through a reflection mirror. The waveguide may include at least one diffraction element such as a diffractive optical element (DOE) and a holographic optical element (HOE) or at least one of reflective elements (e.g., a reflection mirror). In an embodiment, the waveguide may guide the light emitted from the displays 405 and 410 to the eyes of the user, using the at least one diffractive element or reflective element included in the waveguide.

According to an embodiment, the diffractive element may include the input optical member 420 and/or an output optical member (not shown). For example, the input optical member 420 may be an input grating area, and the output optical member (not shown) may be an output grating area. The input grating area may function as an input terminal to diffract (or reflect) light output from the display (e.g., the first display 405 and the second display 410) (e.g., a micro light-emitting diode (LED)) to transmit the light to a transparent member (e.g., the first transparent member 425*a* and the second transparent member 425*b*) of the screen display portions 415*a* and 415*b*. The output grating area may function as an exit to diffract (or reflect), to the eyes of the user, the light transmitted to the transparent members (e.g., the first transparent member 425*a* and the second transparent member 425*b*) of the waveguide.

According to an embodiment, reflective elements may include a total internal reflection optical element or a total internal reflection waveguide for total internal reflection (TIR). For example, TIR, which is one of schemes for inducing light, may form an angle of incidence such that light (e.g., a virtual image) entering through the input grating area is completely reflected from one surface (e.g., a specific surface) of the waveguide, to completely transmit the light to the output grating area.

In an embodiment, the light emitted from the displays 405 and 410 may be guided to the waveguide through the input optical member 420. Light traveling in the waveguide may be guided toward the eyes of the user through the output optical member. The screen display portions 415*a* and 415*b* may be determined based on light emitted toward the eyes of the user.

In an embodiment, the first cameras 445*a*, 445*b*, 445*c*, and 445*d* may each include a camera used for three degrees of freedom (3DoF) and six degrees of freedom (6DoF) head tracking, hand detection and tracking, and gesture and/or space recognition. For example, the first cameras 445*a*, 445*b*, 445*c*, and 445*d* may each include a global shutter (GS) camera to detect a movement of a head and a hand and track the movement.

For example, a stereo camera may be applied to the first cameras 445*a*, 445*b*, 445*c*, and 445*d* for head tracking and space recognition, and a camera with the same standard and performance may be applied. A GS camera having excellent performance (e.g., image dragging) may be used for the first cameras 445*a*, 445*b*, 445*c*, and 445*d* to detect a minute movement such as a quick movement of a hand or a finger and to track the movement.

According to an embodiment, a rolling shutter (RS) camera may be used for the first cameras 445*a*, 445*b*, 445*c*, and 445*d*. The first cameras 445*a*, 445*b*, 445*c*, and 445*d* may perform a SLAM function through space recognition and depth capturing for 6DoF tracking. The first cameras 445*a*, 445*b*, 445*c*, and 445*d* may perform a user gesture recognition function.

In an embodiment, the second cameras 475*a* and 475*b* may be used for detecting and tracking the pupil. The second cameras 475*a* and 475*b* may be referred to as a camera for eye tracking (ET). The second cameras 475*a* and 475*b* may track a gaze direction of the user. In consideration of the gaze direction of the user, the electronic device 400 may position a center of a virtual image projected on the screen display portions 415*a* and 415*b* according to the gaze direction of the user.

A GS camera may be used for the second cameras 475*a* and 475*b* to detect the pupil and track a quick pupil movement. The second cameras 475*a* and 475*b* may be installed respectively for a right eye and a left eye, and a camera having the same performance and standard may be used for the second cameras 475*a* and 475*b* for the right eye and the left eye.

In an embodiment, the third camera 465 may be referred to as a "high resolution (HR)" or a "photo video (PV)," and may include a high-resolution camera. The third camera 465 may include a color camera having functions for obtaining a high-quality image, such as an automatic focus (AF) function and an optical image stabilizer (OIS). The examples are not limited thereto, and the third camera 465 may include a GS camera or a RS camera.

In an embodiment, at least one sensor (e.g., a gyro sensor, an acceleration sensor, a geomagnetic sensor, a touch sensor, an illuminance sensor, and/or a gesture sensor), the first cameras 445*a*, 445*b*, 445*c*, and 445*d* may perform at least one of 6DoF head tracking, pose estimation and prediction, gesture and/or space recognition, or a SLAM function through depth imaging.

In an embodiment, the first cameras 445*a*, 445*b*, 445*c*, and 445*d* may be classified and used as a camera for head tracking and a camera for hand tracking.

In an embodiment, the lighting units 430*a* and 430*b* may be used differently according to positions at which the lighting units 430*a* and 430*b* are attached. For example, the lighting units 430*a* and 430*b* may be attached together with the first cameras 445*a*, 445*b*, 445*c*, and 445*d* mounted around a hinge (e.g., the first hinge 440*a* and the second hinge 440*b*) that connects a frame and a temple or around a bridge that connects the frame. If capturing is performed using a GS camera, the lighting units 430*a* and 430*b* may be used to supplement a surrounding brightness. For example, the lighting units 430*a* and 430*b* may be used in a dark environment or when a subject to be captured may not be readily detected due to mixing of various light sources and reflected light.

In an embodiment, a PCB (e.g., the first PCB 435*a* and the second PCB 435*b*) may include a processor (not shown), a memory (not shown), and a communication module (not shown) that control components of the electronic device 400. In addition, the PCB (e.g., the first PCB 435*a* and the second PCB 435*b*) may include the processor 210, the first light driver 231, and the second light driver 232 of FIG. 2.

The communication module may be configured in a same way as the communication module of FIG. 3. The communication module may support establishing a direct (e.g., wired) communication channel or a wireless communication channel between the electronic device 400 and an external electronic device and performing communication through the established communication channel. The PCB may transmit electrical signals to the components constituting the electronic device 400.

The communication module (not shown) may include one or more communication processors that are operable independently of the processor and that support a direct (e.g., wired) communication or a wireless communication. According to an embodiment, the communication module (not shown) may include a wireless communication module (e.g., a cellular communication module, a short-range wireless communication module, or a GNSS communication module) or a wired communication module (e.g., a LAN communication module, or a PLC module). A corresponding one (not shown) of these communication modules may communicate with the external electronic device via a short-range communication network (e.g., Bluetooth™, Wi-Fi direct, or IrDA) or a long-range communication network (e.g., a legacy cellular network, a 5G network, a next-generation communication network, the Internet, or a computer network (e.g., a LAN or a WAN)). These various types of communication modules may be implemented as a single component (e.g., a single chip), or may be implemented as multi components (e.g., multi chips) separate from each other.

The wireless communication module may support a 5G network after a 4G network, and a next-generation communication technology, e.g., an NR access technology. The NR access technology may support eMBB, mMTC, or URLLC. The wireless communication module may support a high-frequency band (e.g., a mmWave band) to achieve, e.g., a high data transmission rate. The wireless communication module may support various technologies for securing performance on a high-frequency band, such as, e.g., beam-forming, MIMO, FD-MIMO, an array antenna, analog beam-forming, or a large scale antenna.

The electronic device 400 may further include an antenna module (not shown). The antenna module may transmit or receive a signal or power to or from the outside (e.g., the external electronic device) of the electronic device 400. According to an embodiment, the antenna module may include an antenna including a radiating element including a conductive material or a conductive pattern formed in or on a substrate (e.g., the first PCB 435*a* and the second PCB 435*b*). According to an embodiment, the antenna module may include a plurality of antennas (e.g., array antennas).

In an embodiment, the plurality of microphones (e.g., the first microphone 450*a*, the second microphone 450*b*, and the third microphone 450*c*) may convert an external acoustic signal into electrical audio data. The electrical audio data may be variously utilized according to a function (or an application being executed) being performed by the electronic device 400.

In an embodiment, the plurality of speakers (e.g., the first speaker 455*a* and the second speaker 455*b*) may output audio data received from the communication module or stored in the memory.

In an embodiment, one or more batteries 460 may be included, and may supply power to components constituting the electronic device 400.

In an embodiment, the visors 470*a* and 470*b* may adjust a transmittance amount of external light incident on the eyes of the user according to a transmittance. The visors 470*a* and 470*b* may be positioned in front or behind the screen display portions 415*a* and 415*b*. The front side of the screen display portions 415*a* and 415*b* may refer to a direction opposite to the user wearing the electronic device 400, and the rear side may refer to a direction of the user wearing the electronic device 400. The visors 470*a* and 470*b* may protect the screen display portions 415*a* and 415*b* and adjust the transmittance amount of external light.

For example, the visors 470*a* and 470*b* may include an electrochromic element that changes color according to applied power to adjust a transmittance. Electrochromism is a phenomenon in which an applied power triggers an oxidation-reduction reaction which causes a change in color. The visors 470*a* and 470*b* may adjust a transmittance of external light, using the color changing properties of the electrochromic element.

For example, the visors 470*a* and 470*b* may include a control module and the electrochromic element. The control module may control the electrochromic element to adjust a transmittance of the electrochromic element.

Figure 5:
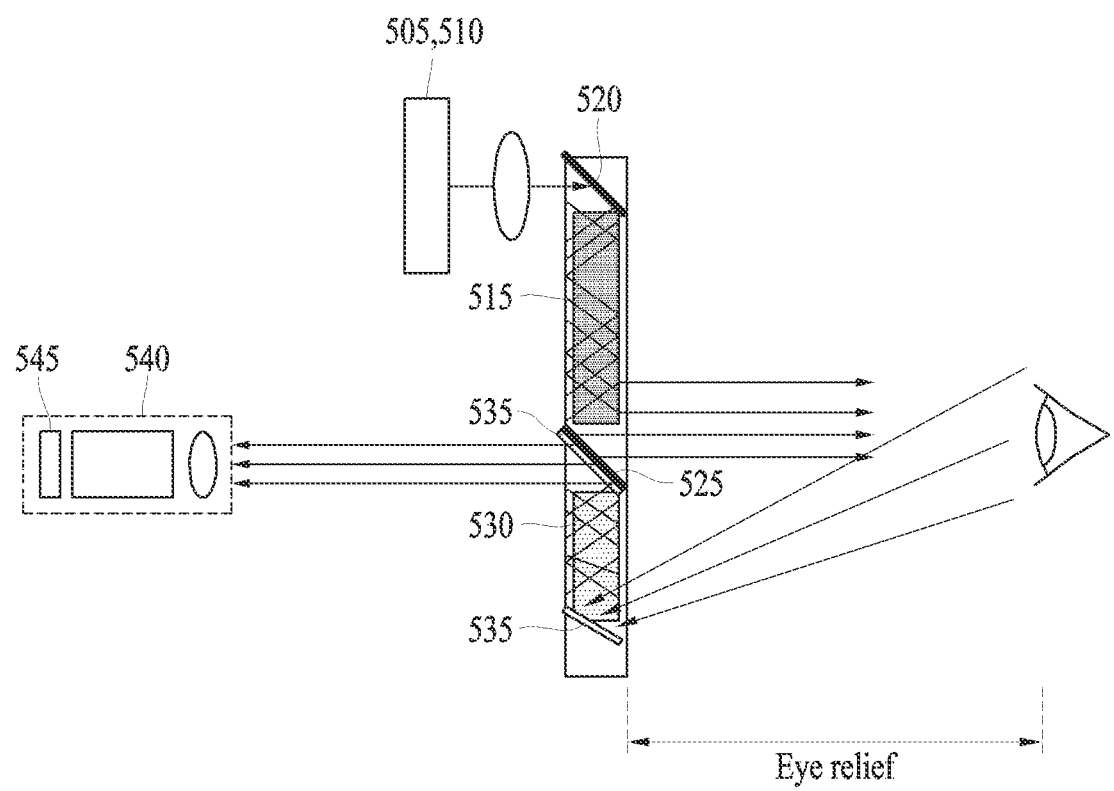
FIG. 5 is a diagram illustrating a camera and an eye tracking sensor of an electronic device according to an embodiment of the disclosure.

FIG. 5 is a diagram illustrating a camera and an eye tracking sensor of an electronic device according to an embodiment of the disclosure.

Referring to FIG. 5, according to an embodiment, an electronic device (e.g., an electronic device 400 of FIG. 4) implemented in a form of wearable AR glasses may include displays 505 and 510 (e.g., displays 405 and 410), an optical waveguide 515 (or a waveguide), an input optical member 520 (e.g., an input optical member 420 of FIG. 4), an output optical member 525, an eye tracking (ET) optical waveguide 530 (or an ET waveguide), an ET splitter 535, a camera 540 (e.g., second cameras 275*a* and 275*b*), an eye tracking sensor 545, and a light source portion (not shown) (e.g., right-eye odd-numbered light sources 441, 442, and 443, the left-eye odd-numbered light sources 451, 452, and 453, the right-eye even-numbered light sources 461, 462, and 463, and the left-eye even-numbered light sources 471, 472, and 473 of FIG. 4).

Referring to FIG. 5, light output from the displays 505 and 510 of the electronic device is entered in the input optical member 520, passed through the optical waveguide 515, and transmitted to the user's eyes from the output optical member 525.

Referring to FIG. 5, the camera 540 may obtain an image of the user's eye. For example, the image of the user's eye may be transmitted to the ET splitter 535 on the upper side by inputting to the ET splitter 535 on the lower side and passing through the ET optical waveguide 530. The camera 540 may obtain the image of the user's eye from the ET splitter 535 on the upper side.

The light source portion may output IR light to the user's pupil region. The infrared light may be reflected from the user's pupil and transmitted to the ET splitter 535 together with the image of the user's eye. The image of the user's eye obtained by the camera 540 may include the reflected IR light. The ET sensor 545 may sense the IR light reflected from the user's pupil.

Hereinafter, a method according to example embodiments as described herein will be described with reference to the drawings.

Figure 6:
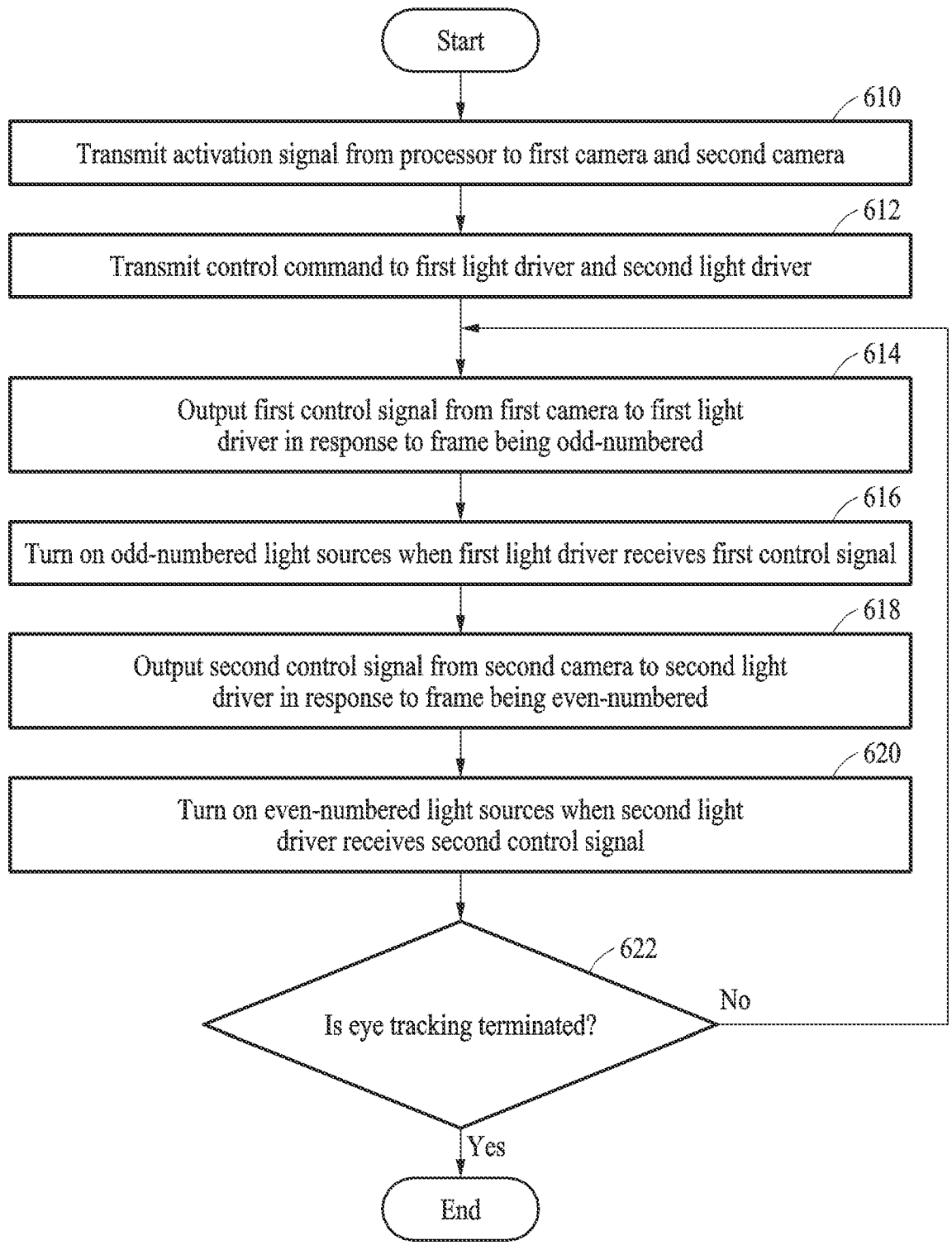
FIG. 6 is a flowchart illustrating an example of a process of controlling a light source to perform eye tracking using a glint in an electronic device according to an embodiment of the disclosure.

FIG. 6 is a flowchart illustrating an example of a process of controlling a light source to perform eye tracking using a glint in an electronic device according to an embodiment of the disclosure.

Referring to FIG. 6, in operation 610, a processor 210 may transmit an activation signal to a first camera 221 and a second camera 222.

In operation 612, the processor 210 may transmit, to the first light driver 231 and the second light driver 232, a control command to instruct the first and second light drivers to operate according to a first control signal or a second control signal. The control command may be a command to turn on light sources controlled by the first light driver 231 based on a pattern in response to the first control signal being received by the first light driver 231 and a command to turn on light sources controlled by the second light driver 232 based on a pattern in response to the second control signal being received by the second light driver 232. In an embodiment, operation 610 and operation 612 may be simultaneously performed in parallel.

The first control signal and the second control signal may be a signal in a form of a strobe. The first control signal may be a signal to be output from the first camera 221 to the first light driver 231, and the second control signal may be a signal to be output from the second camera 222 to the second light driver 232.

In operation 614, the first camera 221 may output the first control signal to the first light driver 231 in response to a frame being odd-numbered.

In operation 616, in response to receiving the first control signal from the first camera 221, the first light driver 231 may turn on the right-eye odd-numbered light sources 241, 242, and 243 and the left-eye odd-numbered light sources 251, 252, and 253 for a predetermined time.

In operation 618, the second camera 222 may output the second control signal to the second light driver 232 in response to a frame being even-numbered.

In operation 620, in response to receiving the second control signal from the second camera 222, the second light driver 232 may turn on the right-eye even-numbered light sources 261, 262, and 263 and the left-eye even-numbered light sources 271, 272, and 273 for a predetermined time.

In operation 622, the processor 210 may determine whether eye tracking is terminated.

In response to the determination of operation 622 that the eye tracking is not terminated, the processor may return to operation 614 and repeat the subsequent operations.

In response to the determination of operation 622 that the eye tracking is terminated, the processor may terminate the algorithm of FIG. 6.

Figure 7:
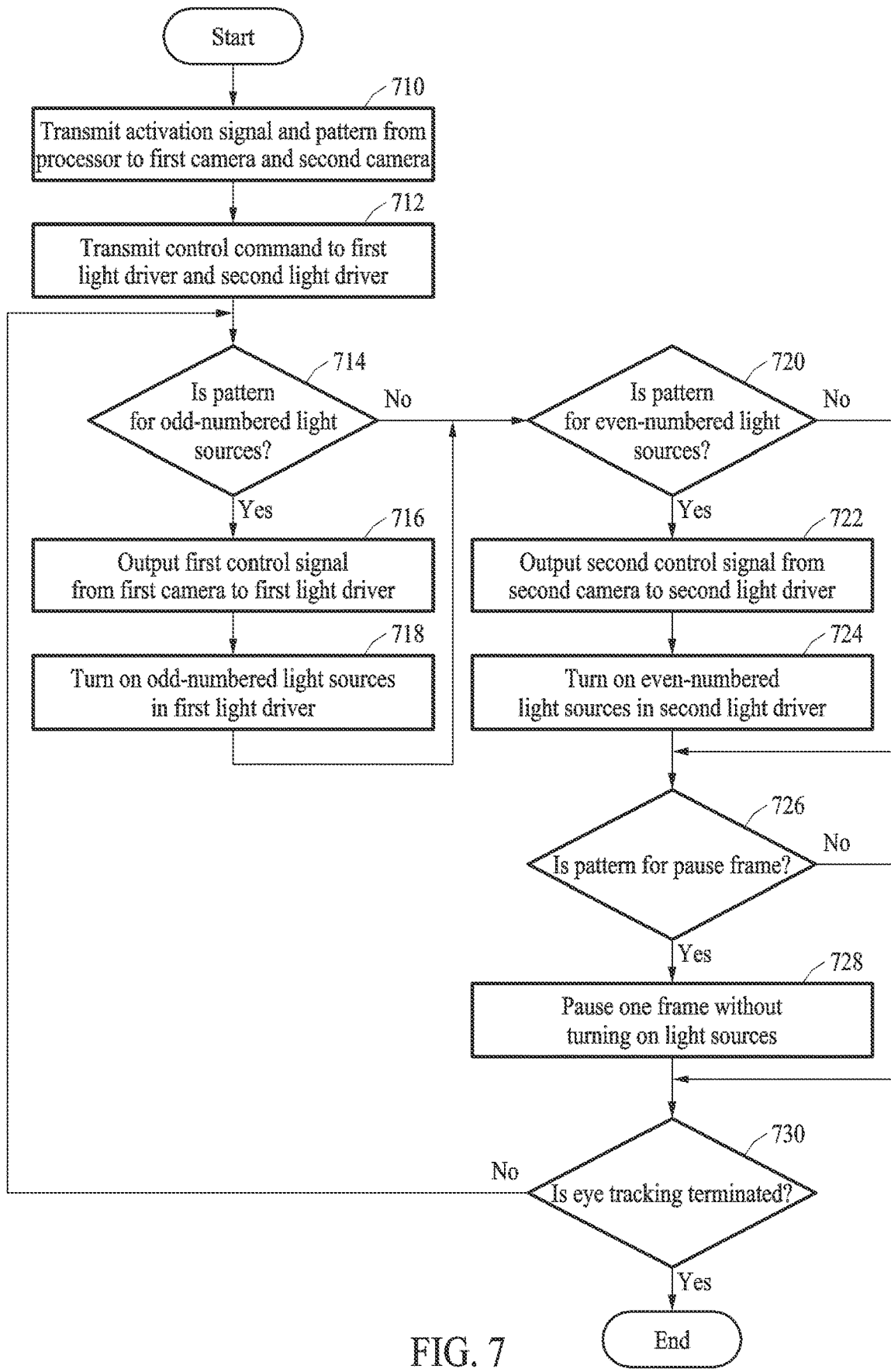
FIG. 7 is a flowchart illustrating another example of a process of controlling a light source to perform eye tracking using a glint in an electronic device according to an embodiment of the disclosure.

FIG. 7 is a flowchart illustrating another example of a process of controlling a light source to perform eye tracking using a glint in an electronic device according to an embodiment of the disclosure.

Referring to FIG. 7, in operation 710, a processor 210 may transmit, to a first camera 221 and a second camera 222, an activation signal to instruct the first and second cameras to operate according to a pattern.

According to an embodiment, an activation pattern of the first camera 221 and the second camera 222 may be set by a developer in advance in a more suitable form according to a predetermined situation. For example, a pattern may be an iteration of a process of turning on and off odd-numbered light sources and turning on and off even-numbered light sources in sequence. As another example, a pattern may be an iteration of a process of turning on and off the odd-numbered light sources, turning on and off the even-numbered light sources, and pausing for one frame in sequence. However, a pattern is not limited to the above two patterns, and various patterns that are easy to use in the performing of eye tracking may be possible. As another example, a pattern may include a pause in which both the odd-numbered light sources and even-numbered light sources are turned off and also include an operation of simultaneously turning on both the odd-numbered light sources and even-numbered light sources.

In operation 712, the processor 210 may transmit, to the first light driver 231 and the second light driver 232, a control command to instruct the first and second light drivers to operate according to a first control signal or a second control signal. For example, the control command may be a command to turn on light sources controlled by the first light driver 231 based on a pattern in response to the first control signal being received by the first light driver 231 and a command to turn on light sources controlled by the second light driver 232 based on a pattern in response to the second control signal being received by the second light driver 232. In addition, operation 710 and operation 712 may be simultaneously performed in parallel.

In operation 714, the first camera 221 may determine whether a current frame according to the pattern turns on the odd-numbered light sources.

In response to the determination of operation 714 that the current frame according to the pattern turns on the odd-numbered light sources, in operation 716, the first camera 221 may output the first control signal to the first light driver 231.

In operation 718, in response to receiving the first control signal from the first camera 221, the first light driver 231 may turn on the right-eye odd-numbered light sources 241, 242, and 243 and the left-eye odd-numbered light sources 251, 252, and 253 for a predetermined time.

In response to the determination of operation 714 that the current frame according to the pattern does not turn on the odd-numbered light sources, or after operation 718, in operation 720, the second camera 222 may determine whether the current frame according to the pattern turns on the even-numbered light sources.

In response to the determination of operation 720 that the current frame according to the pattern turns on the even-numbered light sources, in operation 722, the second camera 222 may output the second control signal to the second light driver 232 in response to a frame being even-numbered.

In operation 724, in response to receiving the second control signal from the second camera 222, the second light driver 232 may turn on the right-eye even-numbered light sources 261, 262, and 263 and the left-eye even-numbered light sources 271, 272, and 273 for a predetermined time.

In response to the determination of operation 720 that the current frame according to the pattern does not turn on the even-numbered light sources, or after operation 724, in operation 726, the first camera 221 and the second camera 222 may determine whether the current frame according to the pattern is a pause frame that does not output any light sources.

In response to the determination of operation 726 that the current frame according to the pattern is the pause frame, in operation 728, both the first camera 221 and the second camera 222 may not output the first control signal and the second control signal such that the first light driver 231 and the second light driver 232 may pause without turning on light sources.

In response to the determination of operation 726 that the current frame according to the pattern is not the pause frame, or after operation 728, in operation 730, the processor 210 may determine whether eye tracking is terminated.

In response to the determination of operation 730 that the eye tracking is not terminated, the processor may return to operation 714 and repeat the subsequent operations.

In response to the determination of operation 730 that the eye tracking is terminated, the processor may terminate the algorithm of FIG. 7.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as compact disc (CD) read-only memory (ROM) (CD-ROM) discs or digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

According to an embodiment, an electronic device 200, 301, 400 may include a plurality of light sources 241 to 243, 251 to 253, 261 to 263, 271 to 273, 441 to 443, 451 to 453, 461 to 463, and 471 to 473 configured to generate a glint in each of right and left eyes, a first camera 221 configured to output, to a first light driver 231, a first control signal to control odd-numbered light sources 241 to 243, 251 to 253, 441 to 443, and 451 to 453 of the plurality of light sources 241 to 243, 251 to 253, 261 to 263, 271 to 273, 441 to 443, 451 to 453, 461 to 463, and 471 to 473 according to a pattern, a second camera 222 configured to output, to a second light driver 232, a second control signal to control even-numbered light sources 261 to 263, 271 to 273, 461 to 463, and 471 to 473 of the plurality of light sources 241 to 243, 251 to 253, 261 to 263, 271 to 273, 441 to 443, 451 to 453, 461 to 463, and 471 to 473 according to the pattern, the first light driver 231 configured to control the odd-numbered light sources 241 to 243, 251 to 253, 441 to 443, and 451 to 453 according to the first control signal, the second light driver 232 configured to control the even-numbered light sources 261 to 263, 271 to 273, 461 to 463, and 471 to 473 according to the second control signal, and a processor 210, 320 configured to transmit, to the first camera 221 and the second camera 222, an activation signal to instruct the first and second cameras to operate according to the pattern and transmit, to the first light driver 231 and the second light driver 232, a control command to instruct the first and second light drivers to operate according to the first control signal and the second control signal, respectively.

According to an embodiment, the processor 210, 320 may transmit the control command only once when starting eye tracking using the first camera 221 and the second camera 222.

According to an embodiment, the control command may be a command to turn on all light sources controlled by the first light driver 231 in response to the first control signal being received by the first light driver 231 and a command to turn on all light sources controlled by the second light driver 232 in response to the second control signal being received by the second light driver 232.

According to an embodiment, the first light driver 231 may turn on the odd-numbered light sources 241 to 243, 251 to 253, 441 to 443, and 451 to 453 for a predetermined time in response to receiving the first control signal from the first camera 221.

According to an embodiment, the first light driver 231 may control odd-numbered light sources 241 to 243, 251 to 253, 441 to 443, and 451 to 453 of light sources that irradiate light to a right eye and odd-numbered light sources 241 to 243, 251 to 253, 441 to 443, and 451 to 453 of light sources that irradiate light to a left eye.

According to an embodiment, the second light driver 232 may turn on the even-numbered light sources 261 to 263, 271 to 273, 461 to 463, and 471 to 473 for a predetermined time in response to receiving the second control signal from the second camera 222.

According to an embodiment, the second light driver 232 may control even-numbered light sources 261 to 263, 271 to 273, 461 to 463, and 471 to 473 of light sources that irradiate light to a right eye and even-numbered light sources 261 to 263, 271 to 273, 461 to 463, and 471 to 473 of light sources that irradiate light to a left eye.

According to an embodiment, the first camera 221 and the second camera 222 may not simultaneously output the first control signal and the second control signal or may simultaneously output the first control signal and the second control signal.

According to an embodiment, the pattern may be an iteration of a process of turning on and off the odd-numbered light sources 241 to 243, 251 to 253, 441 to 443, and 451 to 453 and turning on and off the even-numbered light sources 261 to 263, 271 to 273, 461 to 463, and 471 to 473 in sequence.

According to an embodiment, the pattern may be an iteration of a process of turning on and off the odd-numbered light sources 241 to 243, 251 to 253, 441 to 443, and 451 to 453, turning on and off the even-numbered light sources 261 to 263, 271 to 273, 461 to 463, and 471 to 473, and pausing for one frame in sequence.

According to an embodiment, the first camera 221 may capture a right eye, and the processor 210, 320 may detect a pupil of the right eye in an image of the right eye captured by the first camera 221 and track a movement of the pupil of the right eye.

According to an embodiment, the second camera 222 may capture a left eye, and the processor 210, 320 may detect a pupil of the left eye in an image of the left eye captured by the second camera 222 and track a movement of the pupil of the right eye.

According to an embodiment, an electronic device 200, 301, 400 may include a plurality of light sources 241 to 243, 251 to 253, 261 to 263, 271 to 273, 441 to 443, 451 to 453, 461 to 463, and 471 to 473 configured to generate a glint in each of right and left eyes, a first camera 221 configured to output, to a first light driver 231, a first control signal to control odd-numbered light sources 241 to 243, 251 to 253, 441 to 443, and 451 to 453 of the plurality of light sources 241 to 243, 251 to 253, 261 to 263, 271 to 273, 441 to 443, 451 to 453, 461 to 463, and 471 to 473 in an odd-numbered frame, a second camera 222 configured to output, to a second light driver 232, a second control signal to control even-numbered light sources 261 to 263, 271 to 273, 461 to 463, and 471 to 473 of the plurality of light sources 241 to 243, 251 to 253, 261 to 263, 271 to 273, 441 to 443, 451 to 453, 461 to 463, and 471 to 473 in an even-numbered frame, the first light driver 231 configured to control the odd-numbered light sources 241 to 243, 251 to 253, 441 to 443, and 451 to 453 according to the first control signal, the second light driver 232 configured to control the even-numbered light sources 261 to 263, 271 to 273, 461 to 463, and 471 to 473 according to the second control signal, and a processor 210, 320 configured to transmit, to the first camera 221 and the second camera 222, an activation signal to instruct the first and second cameras to operate according to a pattern and transmit, to the first light driver 231 and the second light driver 232, a control command to instruct the first and second light drivers to operate according to the first control signal and the second control signal, respectively.

According to an embodiment, the processor 210, 320 may transmit the control command only once when starting eye tracking using the first camera 221 and the second camera 222.

According to an embodiment, the first camera 221 and the second camera 222 may not simultaneously output the first control signal and the second control signal or may simultaneously output the first control signal and the second control signal.

According to an embodiment, a method of controlling a light source in an electronic device 200, 301, 400 may include a first operation of transmitting an activation signal from a processor 210, 320 to a first camera 221 and a second camera 222, transmitting, to a first light driver 231 and a second light driver 232, a control command to instruct the first and second light drivers to operate according to a first control signal and a second control signal, respectively, a second operation of outputting the first control signal from the first camera 221 to the first light driver 231 in response to a frame being odd-numbered, a third operation of turning on odd-numbered light sources 241 to 243, 251 to 253, 441 to 443, and 451 to 453 of a plurality of light sources 241 to 243, 251 to 253, 261 to 263, 271 to 273, 441 to 443, 451 to 453, 461 to 463, and 471 to 473 for a predetermined time in response to the first control signal being received by the first light driver 231, a fourth operation of outputting the second control signal from the second camera 222 to the second light driver 232 in response to a frame being even-numbered, a fifth operation of turning on even-numbered light sources 261 to 263, 271 to 273, 461 to 463, and 471 to 473 of the plurality of light sources 241 to 243, 251 to 253, 261 to 263, 271 to 273, 441 to 443, 451 to 453, 461 to 463, and 471 to 473 for a predetermined time in response to the second control signal being received by the second light driver 232, and an operation of repeatedly performing the second to fifth operations until eye tracking is terminated.

According to an embodiment, the control command may be a command to turn on all light sources controlled by the first light driver 231 in response to the first control signal being received by the first light driver 231 and a command to turn on all light sources controlled by the second light driver 232 in response to the second control signal being received by the second light driver 232.

According to an embodiment, the third operation may include turning on odd-numbered light sources 241 to 243, 251 to 253, 441 to 443, and 451 to 453 of light sources that irradiate light to a right eye and odd-numbered light sources 241 to 243, 251 to 253, 441 to 443, and 451 to 453 of light sources that irradiate light to a left eye for the predetermined time in response to the first control signal being received by the first light driver 231.

According to an embodiment, the fifth operation may include turning on even-numbered light sources 261 to 263, 271 to 273, 461 to 463, and 471 to 473 of light sources that irradiate light to a right eye and even-numbered light sources 261 to 263, 271 to 273, 461 to 463, and 471 to 473 of light sources that irradiate light to a left eye for the predetermined time in response to the second control signal being received by the second light driver 232.

According to an embodiment, the second operation and the fourth operation may not be performed simultaneously or may be performed simultaneously.

The disclosure relates to a device and method of controlling a light source in eye tracking using a glint. By transmitting, from a processor to a first camera and a second camera, an activation signal to instruct the first and second cameras to operate according to a pattern, transmitting, to a first light driver and a second light driver, a control command to instruct the first and second light drivers to operate according to a control signal (a first control signal or a second control signal) corresponding to each of the first and second light drivers, and preventing the processor from intervening in a process of turning on and off odd-numbered light sources and even-numbered light sources, likelihood of an error in control caused by transmission of a control command at short intervals may be decreased, and less power may be consumed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a plurality of light sources configured to generate a glint in each of right and left eyes;
   a first camera configured to output, to a first light driver, a first control signal to control odd-numbered light sources of the plurality of light sources according to a pattern;
   a second camera configured to output, to a second light driver, a second control signal to control even-numbered light sources of the plurality of light sources according to the pattern;
   the first light driver configured to control the odd-numbered light sources according to the first control signal;
   the second light driver configured to control the even-numbered light sources according to the second control signal; and
   a processor configured to:
      transmit, to the first camera and the second camera, an activation signal to instruct the first and second cameras to operate according to the pattern, and
      transmit, to the first light driver and the second light driver, a control command to instruct the first and second light drivers to operate according to the first control signal and the second control signal, respectively.

2. The electronic device of claim 1, wherein the processor is further configured to transmit the control command only once in response to starting eye tracking using the first camera and the second camera.

3. The electronic device of claim 1, wherein the control command is a command to turn on all light sources controlled by the first light driver in response to the first control signal being received by the first light driver and a command to turn on all light sources controlled by the second light driver in response to the second control signal being received by the second light driver.

4. The electronic device of claim 1, wherein the first light driver is further configured to turn on the odd-numbered light sources for a predetermined time in response to receiving the first control signal from the first camera.

5. The electronic device of claim 1, wherein the first light driver is further configured to control odd-numbered light sources of light sources that irradiate light to a right eye and odd-numbered light sources of light sources that irradiate light to a left eye.

6. The electronic device of claim 1, wherein the second light driver is further configured to turn on the even-numbered light sources for a predetermined time in response to receiving the second control signal from the second camera.

7. The electronic device of claim 1, wherein the second light driver is further configured to control even-numbered light sources of light sources that irradiate light to a right eye and even-numbered light sources of light sources that irradiate light to a left eye.

8. The electronic device of claim 1, wherein the first camera and the second camera are further configured to not simultaneously output the first control signal and the second control signal or to simultaneously output the first control signal and the second control signal.

9. The electronic device of claim 1, wherein the pattern is an iteration of a process of turning on and off the odd-numbered light sources and turning on and off the even-numbered light sources in sequence.

10. The electronic device of claim 1, wherein the pattern is an iteration of a process of turning on and off the odd-numbered light sources, turning on and off the even-numbered light sources, and pausing for one frame in sequence.

11. The electronic device of claim 1,
wherein the first camera is further configured to capture a right eye, and
wherein the processor is further configured to:
detect a pupil of the right eye in an image of the right eye captured by the first camera, and
track a movement of the pupil of the right eye.

12. The electronic device of claim 1,
wherein the second camera is further configured to capture a left eye, and
wherein the processor is further configured to:
detect a pupil of the left eye in an image of the left eye captured by the second camera, and
track a movement of the pupil of the left eye.

13. An electronic device, comprising:
a plurality of light sources configured to generate a glint in each of right and left eyes;
a first camera configured to output, to a first light driver, a first control signal to control odd-numbered light sources of the plurality of light sources in an odd-numbered frame;
a second camera configured to output, to a second light driver, a second control signal to control even-numbered light sources of the plurality of light sources in an even-numbered frame;
the first light driver configured to control the odd-numbered light sources according to the first control signal;
the second light driver configured to control the even-numbered light sources according to the second control signal; and
a processor configured to:
transmit, to the first camera and the second camera, an activation signal to instruct the first and second cameras to operate according to a pattern, and
transmit, to the first light driver and the second light driver, a control command to instruct the first and second light drivers to operate according to the first control signal and the second control signal, respectively.

14. The electronic device of claim 13, wherein the processor is further configured to transmit the control command only once in response to starting eye tracking using the first camera and the second camera.

15. The electronic device of claim 13, wherein the first camera and the second camera are further configured to not simultaneously output the first control signal and the second control signal or to simultaneously output the first control signal and the second control signal.

16. A method of controlling a light source in an electronic device, the method comprising:
a first operation of transmitting an activation signal from a processor to a first camera and a second camera and transmitting, to a first light driver and a second light driver, a control command to instruct the first and second light drivers to operate according to a first control signal and a second control signal, respectively;
a second operation of outputting the first control signal from the first camera to the first light driver in response to a frame being odd-numbered;
a third operation of turning on odd-numbered light sources of a plurality of light sources for a predetermined time in response to the first control signal being received by the first light driver;
a fourth operation of outputting the second control signal from the second camera to the second light driver in response to a frame being even-numbered;
a fifth operation of turning on even-numbered light sources of the plurality of light sources for a predetermined time in response to the second control signal being received by the second light driver; and
an operation of repeatedly performing the second to fifth operations until eye tracking is terminated.

17. The method of claim 16, wherein the control command is a command to turn on all light sources controlled by the first light driver in response to the first control signal being received by the first light driver and a command to turn on all light sources controlled by the second light driver in response to the second control signal being received by the second light driver.

18. The method of claim 16, wherein the third operation comprises turning on odd-numbered light sources of light sources that irradiate light to a right eye and odd-numbered light sources of light sources that irradiate light to a left eye for the predetermined time in response to the first control signal being received by the first light driver.

19. The method of claim 16, wherein the fifth operation comprises turning on even-numbered light sources of light sources that irradiate light to a right eye and even-numbered light sources of light sources that irradiate light to a left eye for the predetermined time in response to the second control signal being received by the second light driver.

20. The method of claim 16, wherein the second operation and the fourth operation are not performed simultaneously or are performed simultaneously.

* * * * *